(12) United States Patent
Bhatia et al.

(10) Patent No.: US 9,990,243 B2
(45) Date of Patent: Jun. 5, 2018

(54) USING SPANNING TREE PROTOCOL TO DETERMINE A LAYER 2 TOPOLOGY OF AN ETHERNET TYPE NETWORK

(71) Applicant: FixStream Networks, Inc., San Jose, CA (US)

(72) Inventors: Siddharth Bhatia, New Delhi (IN); Sameer Padhye, Cupertino, CA (US)

(73) Assignee: FixStream Networks Inc., San Jose, CA (US)

( * ) Notice: Subject to any disclaimer, the term of this patent is extended or adjusted under 35 U.S.C. 154(b) by 67 days.

(21) Appl. No.: 15/090,553

(22) Filed: Apr. 4, 2016

(65) Prior Publication Data
US 2016/0294632 A1 Oct. 6, 2016

Related U.S. Application Data (60) Provisional application No. 62/142,225, filed on Apr. 2, 2015, provisional application No. 62/142,255, filed on Apr. 2, 2015, provisional application No. 62/158,868, filed on May 8, 2015, provisional application No. 62/193,760, filed on Jul. 17, 2015.

(51) Int. Cl.
| | |
|---|---|
| G06F 11/07 | (2006.01) |
| H04L 12/24 | (2006.01) |
| G06F 11/32 | (2006.01) |
| H04L 12/26 | (2006.01) |

(52) U.S. Cl.
CPC .......... *G06F 11/0769* (2013.01); *G06F 11/32* (2013.01); *H04L 41/12* (2013.01); *H04L 41/22* (2013.01); *H04L 41/0618* (2013.01); *H04L 43/0876* (2013.01)

(58) Field of Classification Search
CPC ...... G06F 11/0769; G06F 11/32; H04L 41/12; H04L 41/22; H04L 41/0618; H04L 43/0875
See application file for complete search history.

(56) References Cited

U.S. PATENT DOCUMENTS

| | | | |
|---|---|---|---|
| 2006/0133297 A1* | 6/2006 | Quist | ...................... H04L 41/12 370/254 |
| 2007/0211730 A1* | 9/2007 | Cuthbert | ............... H04L 12/462 370/395.53 |

* cited by examiner

*Primary Examiner* — Duc C Ho
(74) *Attorney, Agent, or Firm* — K&L Gates LLP; Jordan A. Kwan

(57) ABSTRACT

Example methods, apparatuses, and systems are presented for determining a physical (real) topology of an Ethernet type network, including mapping physical switches arranged in a multi-chassis link aggregation group (MC-LAG). Spanning tree protocol (STP) data is obtained via a combination of SNMP queries or SSH/telnet connectors. The STP data and MAC addresses are collected initially for all the switches in the mapping criteria. After collecting this data, pairs of switches are formed (e.g., randomly) and the collected data is correlated and stored according to the set of rules described in embodiments of the present disclosure in order to find switch to switch links.

20 Claims, 5 Drawing Sheets

USING SPANNING TREE PROTOCOL TO DETERMINE A LAYER 2 TOPOLOGY OF AN ETHERNET TYPE NETWORK

CROSS REFERENCES TO RELATED APPLICATIONS

This application claims the benefits of U.S. Provisional Application 62/142,225, filed Apr. 2, 2015, and titled "USING SPANNING TREE PROTOCOL TO DETERMINE A LAYER 2 TOPOLOGY OF AN ETHERNET TYPE NETWORK," U.S. Provisional Application 62/142,255, filed Apr. 2, 2015, and titled "SYSTEM AND METHOD FOR CREATING APPLICATION BUSINESS GROUP & APPLICATION EPICENTERS," U.S. Provisional Application 62/158,868, filed May 8, 2015, and titled "METHOD OF DISCOVERING NETWORK TOPOLOGY," and U.S. Provisional Application 62/193,760, filed Jul. 17, 2015, and titled "METHOD AND SYSTEM FOR DISTRIBUTED FAULT COLLECTION AND CORRELATION IN A VIRTUALIZED DATA CENTER NETWORK," the disclosures of which are hereby incorporated herein in their entireties and for all purposes. This application is also related to U.S. Non-provisional Application Ser. No. 15/090,546, titled "SYSTEM AND METHOD FOR DIAGNOSING DATABASE NETWORK INTEGRITY USING APPLICATION BUSINESS GROUPS & APPLICATION EPICENTERS," filed herewith, the disclosure of which is incorporated herein by reference in its entirety and for all purposes.

TECHNICAL FIELD

The subject matter disclosed herein generally relates to network topologies in Ethernet-type networks. More specifically, the present disclosures relate to determining physical connections between layer 2 devices in an Ethernet-type network using a combination of spanning tree protocol (STP) techniques and address forwarding tables by creating pairs of layer 2 devices and correlating the collected data. The present disclosures also address networks that include Multi-Chassis Link Aggregation (MC-LAG) features.

BACKGROUND

In Ethernet-type networks, such as a network of switches forwarding information to multiple end hosts, there are implementations to determine a layer 2 topology (e.g., data link layer of the OSI model) without using link discovery protocols like the Cisco Discovery Protocol (CDP), Link Layer Discovery Protocol (LLDP), etc. by leveraging data from the spanning tree protocol (STP data). One example is a method disclosed according to U.S. Patent Publication number US20090285128 A1 Solarwinds.net Inc., which discusses using STP protocol to determine layer 2 topology maps, but does not consider MC-LAG implementations.

The LLDP is formally referred to by the IEEE as Station and Media Access Control Connectivity Discovery specified in standards document IEEE 802.1AB.

The Cisco Discovery Protocol (CDP) is a proprietary Data Link Layer protocol developed by Cisco Systems.

In some cases, layer-2 topology detection is performed using known methods, such as LLDP, Cisco's CDP and various other protocols. However, these techniques are vendor specific in most of the cases. In other cases, the network may not be configured for LLDP, making it difficult to determine the physical layer 2 topology. Embodiments of present application relate to solving this problem and others.

In common layer-2 networks, STP data is transmitted between switches to:
a) Determine loop-free topology for any bridged Ethernet local area network, and
b) To provide automatic backup paths if any active link fails.

To determine loop free paths using STP protocol, the switches use data frames called BPDU (bridge protocol data units) to exchange information about the bridge ID's and root path costs. The information received in BPDU's are stored in STP tables of the switches. The data stored in these tables of each switch can be used to correlate switch to switch links in combination with address forwarding tables.

Ethernet bridges based on their MAC layer addresses learn the interface on which they learn a particular source address and associate that interface with that MAC address. Now when the Ethernet Bridge receives a frame to be sent to an already learnt MAC address, it sends the frame out of that interface. These MAC addresses stored with the interface is referred to as a address forwarding table (AFT) or CAM table.

A MLAG (multi chassis link aggregation group, or MC-LAG) deployment (i.e., a LAG across more than one node) is done where the following are needed:
a) Multi-homing for redundancy;
b) active-active configuration to utilize all links which otherwise may get blocked by spanning tree; and
c) No modification for the LAG partner.

Here, methods include taking a most common implemented solution that the STP runs with a negotiated system-id while the nodes are MLAG active and operational.

Figure 1A:
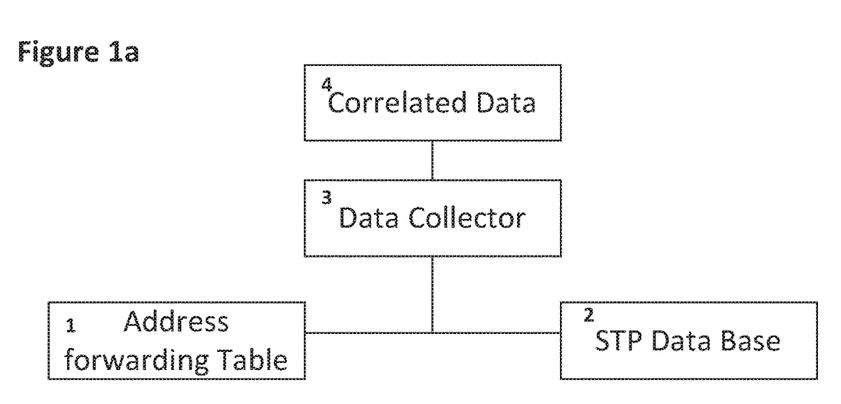
FIG. 1a is a high level diagram of a links mapping system using STP and address forwarding table information, according to some embodiments.
Figure 1B:
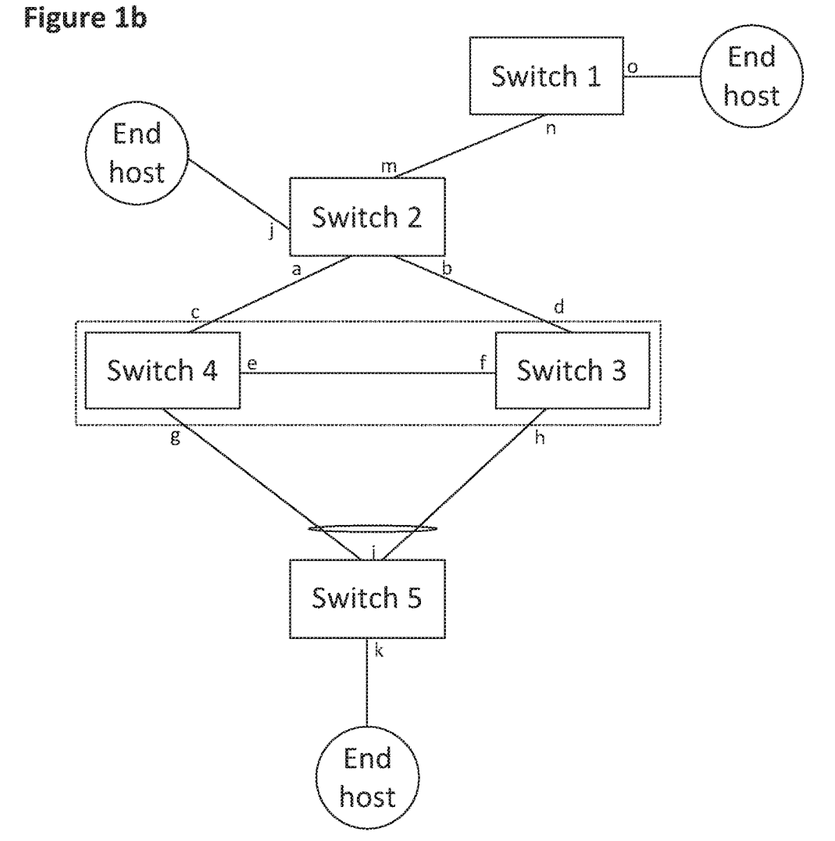
FIG. 1b is an example network that may be mapped using the methods described herein.

As an example scenario, as shown in FIG. 1b, switch 5 is in an MLAG setup where it is connected to switch 4 and switch 3. The port "g" on switch 4 and port "h" on switch 3 use a negotiated system-id to send BPDU's to switch 5 on port "i."

According to conventional techniques, methods for mapping layer 2 topology will detect that the port g and port h are directly connected as they have the same STP information. It does not consider MC-LAG implementations, in that conventional techniques will not accurately distinguish that switches 3 and 4 are in an MC-LAG configuration, and consequently will not identify that that switches 3 and 4 are two physically distinct switches.

The embodiments of the present disclosure solve this problem by using a combination of address forwarding tables and STP information, thereby arriving with true layer-2 physical links.

BRIEF SUMMARY

In some embodiments, a method for determining a layer-2 physical link topology of an Ethernet-type network is presented. The network may include a plurality of interconnected switches and one or more end hosts. The method may include: determining a unique identity for each switch of the plurality of switches; for each switch of the plurality of switches: determining a first list of ports that are connected to an end host among the one or more end hosts; and determining a second list of ports that are connected to another switch among the plurality of switches. The method may further include creating a third list of pairs of switches, the third list comprising all pairwise permutations of the switches among the plurality of switches, wherein each pair comprises a first switch and a second switch; for each pair of switches in the third list: determining if a media access layer (MAC) address is stored on the first switch in said pair; if the MAC address is stored on the first switch, then:

determining a port on the second switch that determined the MAC address stored on the first switch in said pair; accessing STP-based port identifying data of said port of the second switch; comparing the STP-based port identifying data of said port of the second switch with STP-based port identifying data of all ports in the first switch; and if the STP-based port identifying data of said port of the second switch matches the STP-based port identifying data of any port in the first switch, then storing said pair of switches as a physically connected pair of switches; and generating the layer-2 physical link topology using each pair of switches that are stored as physically connected pairs.

In some embodiments, the method may further include: for each pair of switches in the third list that have ports in the second list: for each port in the second list, comparing the STP-based port identifying data of said port of the first switch in said pair of switches with STP-based port identifying data of all ports in the second switch in said pair of switches; and if the STP-based port identifying data matches, storing said pair of switches as a physically connected pair of switches; and generating the layer-2 physical link topology further using each pair of said switches that are stored as physically connected pairs.

In some embodiments, the STP-based port identifying data comprises dot1dStpPortDesignatedBridge and dot1dStpPortDesignatedPort data based on the spanning tree protocol.

In some embodiments, the method may further include: if no MAC address is stored on either the first switch or the second switch in said pair; then discarding the pair of switches from inclusion as part of the layer-2 physical link topology.

In some embodiments, the method may further include: for each switch of the plurality of switches: determining if a MAC address is identifiable on any port of said switch connecting to an end host of the one or more end hosts; and storing the identified MAC address as being correlated with said port of said switch that is connected to said end host.

In some embodiments, at least one of the pairs of switches used to generate the layer-2 physical link topology is arranged in a multi-chassis link aggregation (MLAG) configuration.

In some embodiments, the method may further include: if the STP-based port identifying data of said port of the second switch does not match the STP-based port identifying data of any port in the first switch, then discarding the pair of switches from inclusion as part of the layer-2 physical link topology.

In some embodiments, a system is presented, comprising a spanning tree protocol (STP) database configured to store STP data; an address forwarding table configured to store media access control (MAC) address information; a data collector module configured to access the plurality of switches in the network; and a correlated data engine coupled to the data collector module, the address forwarding table and the STP database. The correlated data engine may include a memory and a processor and be configured to perform any of the methods described herein.

In some embodiments, a computer readable medium having no transitory signals may comprise instructions that, when executed by a processor, cause the process to perform operations comprising any of the methods described herein.

DETAILED DESCRIPTION

Example methods, apparatuses, and systems (e.g., machines) are presented for mapping a true layer 2 (L2) topology in Ethernet-type networks that account for MC-LAG configurations. Several methods have been developed to build network L2 topologies, and algorithms used to build the topologies vary depending on the approach and the targeted use cases. The algorithm in this disclosure is believed to allow for the following:

(1) The algorithm can be used efficiently to build complex topologies which include Multi Chassis Link Aggregation Group (MC-LAG), where multiple nodes represent a single logical LAG to the remote end. The idea is to also address MC-LAG implementations by different vendors like Arista's Multi-Chassis Link Aggregation (MLAG) feature.

(2) The devices in EPG (end point groups) can be identified/used with very simple and efficient use of STP BPDU data.

(3) The algorithm is not vendor specific and can be used in a complex, heterogeneous network setup, where some parts of the network are configured according to one vendor's specifications, while other parts of the network are configured according to another vendor's specifications. In other words, the present disclosures determine layer 2 topology in a multivendor environment without using link discovery protocols like CDP, LLDP, etc.

The following disclosure provides details about the algorithm and its implementation to explain above novelties.

In some embodiments, a computer program or application implemented according to proposed algorithms described herein may create pairs of discovered layer 2 elements and determine the ports by learning their MAC addresses. The program may also leverage STP data to correlate and determine links in the network. In addition, the program may include intelligent end link detection for storing them in a list for further correlation.

In some embodiments, and in response to the above needs, layer 2 topology mappings are deduced by correlating STP (spanning tree protocol) data along with address forwarding table entries. Using the above information, random pair of switches are created and then on each pair, the STP data and AFT data is compared and correlated, identifying switch ports on a switch connecting to other switch ports in a switch.

Initially, the switch ports are individually compared using STP data and stored in lists depending if they are connected to an end host or a switch port in a switch that exchange BPDU. After determining the ports that are connecting to end hosts, where the switch ports learn MAC address of end host/hosts, the MAC address is stored for further correlation.

After all relevant data is collected from the switches, random pairs of switches are created, and on each switch in the pair, the port is determined where it learnt the MAC address of the other switch in the pair that learnt it from an end host. If one of the switches in the pair learnt a MAC address from the other switch in the pair, then the process is continued, else this pair of switches is discarded and the next pair of switches is processed.

From the above method, if the switch port is determined that learnt the MAC address of the other switch that learnt it from an end host, STP data is compared with STP data of all ports of the other switch. The designated bridge address and designated port id of the port of the switch is compared with all ports of the other switch in the pair.

If the STP data matches on ports in both the switches, a direct link is determined and can be stored for topology mapping, else the pair can be discarded and the next pair can be correlated.

With the above method, switch ports are determined that form direct links between switches. For the remaining switch ports where the links were not determined, the process of finding if those switch ports care connected to other switches will be explained in detail in method 301.

Referring now to the figures, FIG. 1*a* shows an example topology mapping machine configured to perform layer 2 topology mapping according to aspects of the present disclosure. The topology mapping machine includes: module 1, which may store a MAC address forwarding table of the switches; module 2, which includes an STP database; module 3, which includes the data collector used to collect data from module 1 and module 2 of the switches; and module 4, which is the correlation engine where the logic and algorithm lies to detect the direct links between switches. Further example details for implementing a machine discussed in FIG. 1*a* is described more in FIG. 4.

The data collector module 3 of FIG. 1*a* may use multiple methods to collect data of module 1 and 2 from the switches. Some of the methods can be, for example:
a) Simple Network Management Protocol (SNMP)
b) SSH/Telnet connectors
c) Application Program Interfaces (APIs)

FIG. 1*b* shows a sample topology with switch nodes, e.g., switch 1, switch 2, etc., with switch ports "m" and "n" forming a direct link and switch port "o" in switch 1 connecting to an end host. The other switches and nodes are labeled similarly, as shown. It is worth noting that node "i" has two switches connected to it, from nodes "g" (Switch 4) and "h" (Switch 3). This indicates that these two switches are in an MLAG configuration. It is an objective to determine the following:
a) Determine switch ports connecting to end hosts and switches;
b) Correlate AFT data and STP data by forming random pairs of detected switches from data collector 3; and
c) Determine what switch port on a switch connects to another switch port in another switch (basically direct link).

The open systems interconnection model (OSI) is a model that characterizes and standardizes the internal functions of a communication system by portioning it into abstraction layers. It is maintained by identification number ISO/IEC 7498-1.

Based on the seven layers of the OSI model, the second layer (data link layer) has two sub layers:
a) Logical link control (LLC) layer; and
b) Media access control (MAC) layer.

The Logical Link Control (LLC) sub layer of the data-link layer manages communications between devices over a single link of a network. LLC is defined in the IEEE 802.2 specification and supports both connectionless and connection-oriented services used by higher-layer protocols. IEEE 802.2 defines a number of fields in data-link layer frames that enable multiple higher-layer protocols to share a single physical data link. The Media Access Control (MAC) sub layer of the data link layer manages protocol access to the physical network medium. The IEEE MAC specification defines MAC addresses, which enable multiple devices to uniquely identify one another at the data link layer.

Referring again to FIG. 1*a*, the data collector 3 may be further configured to collect spanning tree protocol (STP) data from the switches. The spanning tree protocol is a network protocol that ensures loop free topology for any bridged Ethernet local area network.

The main goal of STP is to:
a) Determine loop-free topology for any bridged Ethernet local area network; and
b) Provide automatic backup paths if any active link fails.

STP accomplishes this by transmitting special messages called bridge protocol data units (BPDUs).

The STP specification is defined in IEEE 802.1D, RSTP (rapid spanning tree protocol) is defined in 802.1W, and multiple spanning tree protocol (MSTP) is defined in IEEE 802.1s and later merged into IEEE 802.1Q-2005.

In some embodiments, the MAC address table or the address forwarding table (AFT) 1, referred here, is a table maintained by switches to logic media access control (MAC) addresses of stations to the ports on which they connect to the switch. The data collector 3 also collects this data for the correlation engine 4.

Figure 2A:
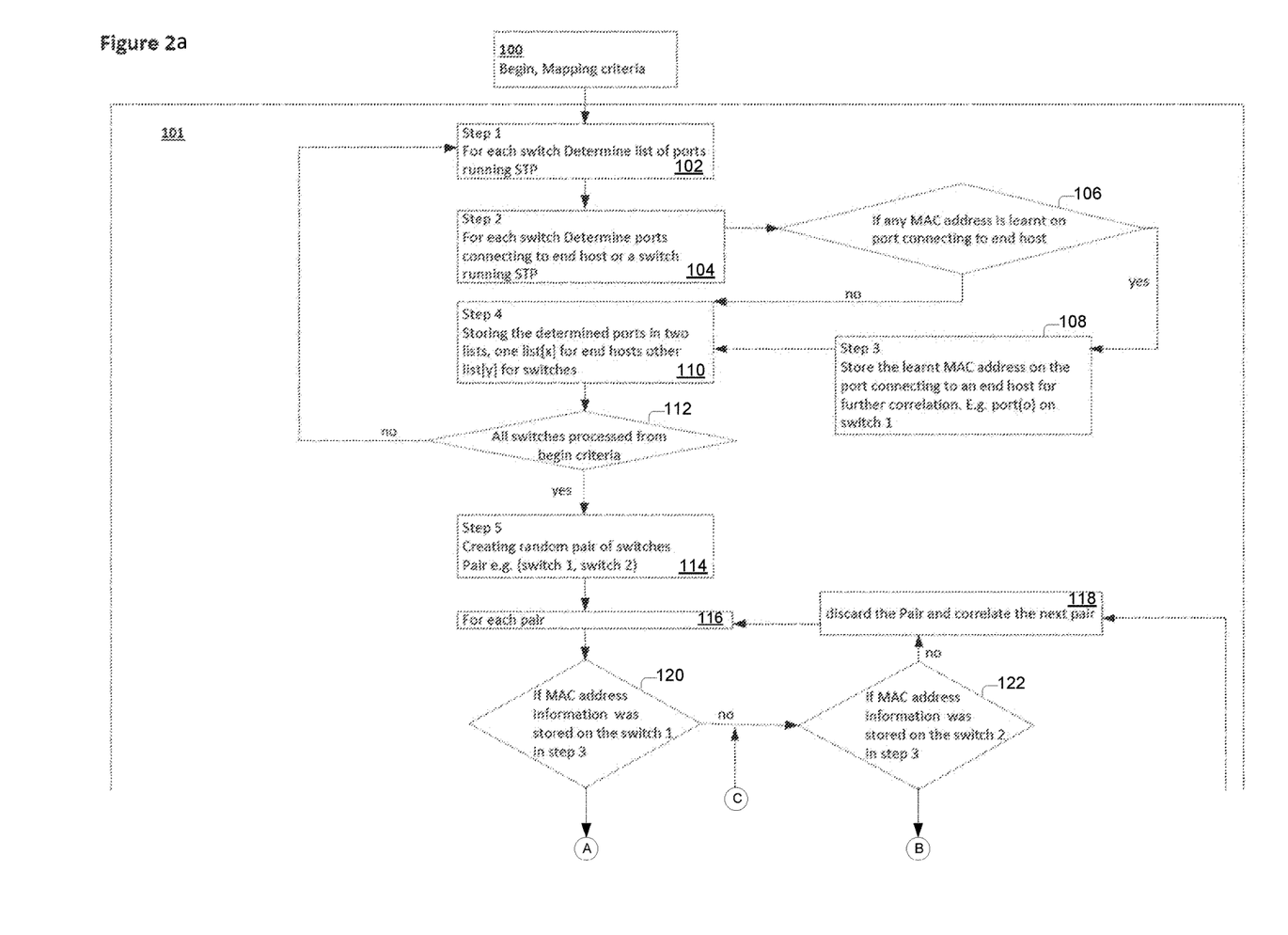
FIGS. 2a and 2b show a flow chart of a layer 2 network mapping method using STP and address forwarding table, according to some embodiments.
Figure 2B:
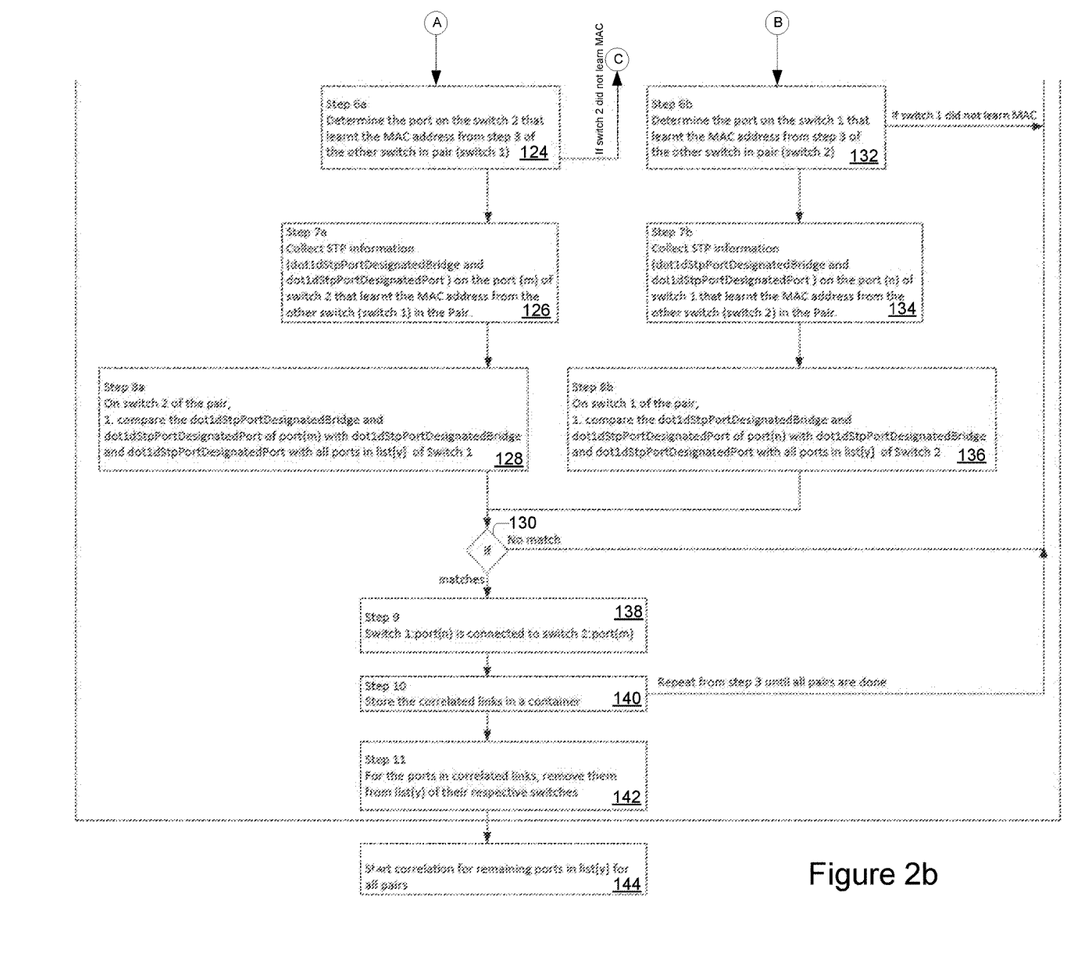

FIGS. 2*a* and 2*b* are now referenced, where FIG. 2*b* is a continuation of the method starting in FIGS. 2*a* for determining a physical mapping of an Ethernet-type network. Referring to FIG. 2*a*, the example method according to aspects of the present disclosure starts with block 100, and begins with the mapping criteria where a range of IP addresses is defined to identify nodes in a network by various methods defined in the data collector module 3 (see FIG. 1*a*). After identifying the switches in the network, the method proceeds with block 101, which includes determining how the switches are interconnected to each other in the network.

In some embodiments, further details into block 101 are described according to the various steps shown in FIGS. 2*a* and 2*b*. Step 1 (102) is to determine the ports on a switch that are running STP, by collecting STP data of the switch.

Step 2 (104) is to determine the ports on a switch which are connected to a switch or an end host. It is safe to assume that switch ports connecting to other switches will have received BPDU more than zero and switch ports connecting to end hosts will not receive any BPDU.

After step 2, at decision block 106, if any port connecting to an end host has a MAC address learnt, the method proceeds to step 3 (108), where the MAC address tables can be stored along with the switch name and port on which the MAC address was learnt, and proceed to step 4 (110). If no MAC address was learnt, then step 3 (106) is skipped and the method still proceeds to step 4 (110).

Step 4 (11) is to store the switch ports in two lists, called list[x] and list[y] for notation purposes.

List[x] contains the switch ports that are connecting to end hosts.

List[y] contains the switch ports connecting to other switches.

If all switches are processed from the begin criteria of block 100, then proceed to step 5 (114), else go back to step 1 (102) to analyze STP data and collect MAC address information as defined between step 1-step 4 for the remaining switches.

Now that all of the switches are accurately categorized into the two groups, the method proceeds to step 5 (114), which is to generate random pairs of switches, for example: switch 1 and switch 2 from FIG. 1b and storing them in a list. The pairs are randomly generated because it is not known a priori how the switches are in the pairs are related to one another, if at all. The method at this stage sets out to map the connections of the switches through pairwise analysis, one pair at a time. Thus, in some embodiments, the pairs of switches may be created in more methodical manners, such as simply by numerical or alphabetical order, or through whatever other means to categorically create pairs of switches, and embodiments are not so limited.

Continuing from step 5 (114), for each pair (116) (here, for clarity, each pair may be labeled having a "switch 1" and a "switch 2") in the list:

At decision block 120, if a MAC address was stored on switch 1's port connecting to an end host, then the method proceeds to step 6a (124, see FIG. 2b), else, moving to decision block 122, if a MAC address was stored on switch 2's port connecting to an end host, proceed to its corresponding step 6b (132), else discard the pair of switches and start with a new pair in the list after step 5 (118).

At Step 6a (124): on switch 2, use the MAC address table to determine the switch port on which it learnt the MAC address information stored for switch 1 in step 3 (108).

If the port is determined, proceed to step 7a (126), else follow the path (following arrow C) to determine if the MAC address was stored on switch 2 from step 3 (108).

At step 7a (126), the method includes collecting STP information of the port "m" (that is, the port out of switch 2 that connects to switch 1, see port m in relation to the switch 2 and switch 1 in FIG. 1b) of the switch 2 that learnt the MAC address of switch 1 in the pair. The data "dot1dStpPortDesignatedBridge" and "dot1dStpPortDesignatedPort" is then collected as defined in Bridge MIB in RFC 1493. In general and for other types of networks having identifiable switches, the types of data that are desired to be collected are bridge identifier data for which a port considers to be the designated bridge for that port's segment, and port identifier data of the port on the designated bridge for that port's segment.

Moving along the path from step 7a (126), at step 8a (128), the method includes comparing the dot1dStpPortDesignatedBridge and dot1dStpPortDesignatedPort data of port m of switch 2 with the same dot1dStpPortDesignatedBridge and dot1dStpPortDesignatedPort information with all the switch ports in list[y] of switch 1.

If the above information matches (decision block 130), for example:
dot1dStpPortDesignatedBridge of port m of switch 2=
dot1dStpPortDesignatedBridge of any port of switch 1, and
dot1dStpPortDesignatedPort of port m of switch 2=dot1dStpPortDesignatedPort of any port of switch 1, Then proceed to step 9 (138). Otherwise, discard the pair and correlate the next pair starting back at step 5 (114). Conceptually, the comparison here is on certain parameters set during the tree formation of the STP protocol that signifies whether there is a direct link between the 2 switches in the pair or not. That is, if the data matches, then it is reasoned that there is in fact a direct connection between the pair.

The method at step 9 (138) proceeds: after the STP information is matched, then it is determined that Switch 1: port n is connected to switch 2: port m (see FIG. 1b for relationship of ports m and n in relation to switches 1 and 2) using a direct link. It is noted that the described method is not limited only to the ports n and m described in FIG. 1b, but rather that these labels are referred to due to their relationships between each other and their respective switches. In general, these concepts described herein apply generally and are consistent with the relationships described herein, rather than strictly what labels are referred to in FIG. 1b.

At step 10 (140): the correlated link can be stored in the correlated data for layer 2 Ethernet topology mapping.

The method continues by repeating steps from step 5 (114) to step 10 (140) for all pairs defined or created at step 5 (114).

Figure 3:
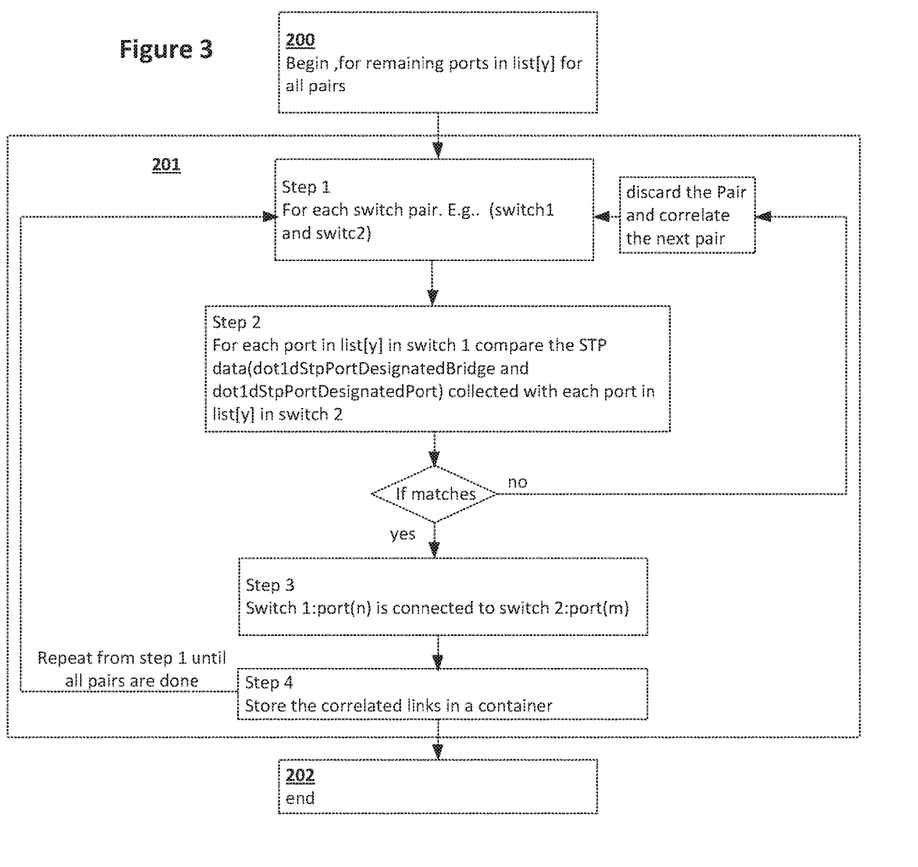
FIG. 3 is a flow chart for mapping remaining links from previous flow chart method, according to some embodiments.

Once all the pairs have been processed and correlated, at step 11 (142): the switch ports that form the direct links with other switches can be removed from the list [y] of the respective switch for further correlation of remaining switch ports in method 200 in FIG. 3.

Within the procedural loop starting at step 5 (114), if the method has reached step 6b (132), then the method may continue through to step 7b (134) and then step 8b (136). Steps 6b, 7b, and 8b are similar to steps 6a, 7a, and 8a, respectively, except the switch being referenced in the pair is the other switch (i.e., "switch 2").

Ultimately, the method proceeds through the iterative process described for each pair until all ports are correlated or matched to their respective switches, and by keeping the valid pairs, it is known which ports connect directly to which other switch. It is noted that the process in FIG. 2 applies to all pairs of switches, and therefore does not apply to the connections of a switch that is connected to an end host (i.e., all ports in list[x]).

Method 101 proceeds to method 200 in FIG. 3 to correlate switch ports remaining in list[y] of each switch. That is, the remaining ports that are connected to end hosts are now correlated, starting at block 200.

Proceeding to block 201, where the method includes correlating each of the remaining ports in list[y], at step 1 (202): for each switch pair determined in step 5 (114) in method 101 (see FIGS. 2a and 2b) proceed to step 2 (204).

At Step 2 (204) of block 201: in a pair of switches, e.g., pair of switch 1 and switch 2 in FIG. 1b, for each switch port in remaining list[y] of both switches, compare dot1dStpPortDesignatedBridge and dot1dStpPortDesignatedPort data obtained in FIG. 2. Or in general, compare the bridge and port identifying data to see if there are matches.

If any port on switch 1 has matching data with any switch port on switch 2 (206), for example if:
dot1dStpPortDesignatedBridge of any port of switch 2=
dot1dStpPortDesignatedBridge of any port of switch 1 and
dot1dStpPortDesignatedPort of port any port of switch 2=
dot1dStpPortDesignatedPort of any port of switch 1, if the above matches on the ports of both switches, determine the port numbers, then proceed to step 3 (21), else discard the pair (208) and repeat from step 1 (202). Conceptually, this type of comparison is similar to the comparison performed in FIG. 2b (at 130), except that this comparison is being performed on the leftover switches that were discarded as pairs in FIGS. 2a and 2b.

Finally, at step 4 (212): after the STP information is matched then it is determined that Switch 1: port n is connected to switch 2: port m using a direct link and store it in correlated data container 4 in FIG. 1*a*.

This process is repeated by checking if all pairs are correlated, else repeat from step 1 (202) with a new switch pair.

Method 201 concludes (214), and by this time the correlated data container 4 in FIG. 1*a* will have the links connecting to other switches for a layer 2 Ethernet topology mapping. Thus, a physical mapping of the network may be achieved, even if at least some of the switches are in an MLAG configuration.

In some embodiments, this data may then be displayed graphically to illustrate the connections in a map of switches and nodes, for example.

Figure 4:
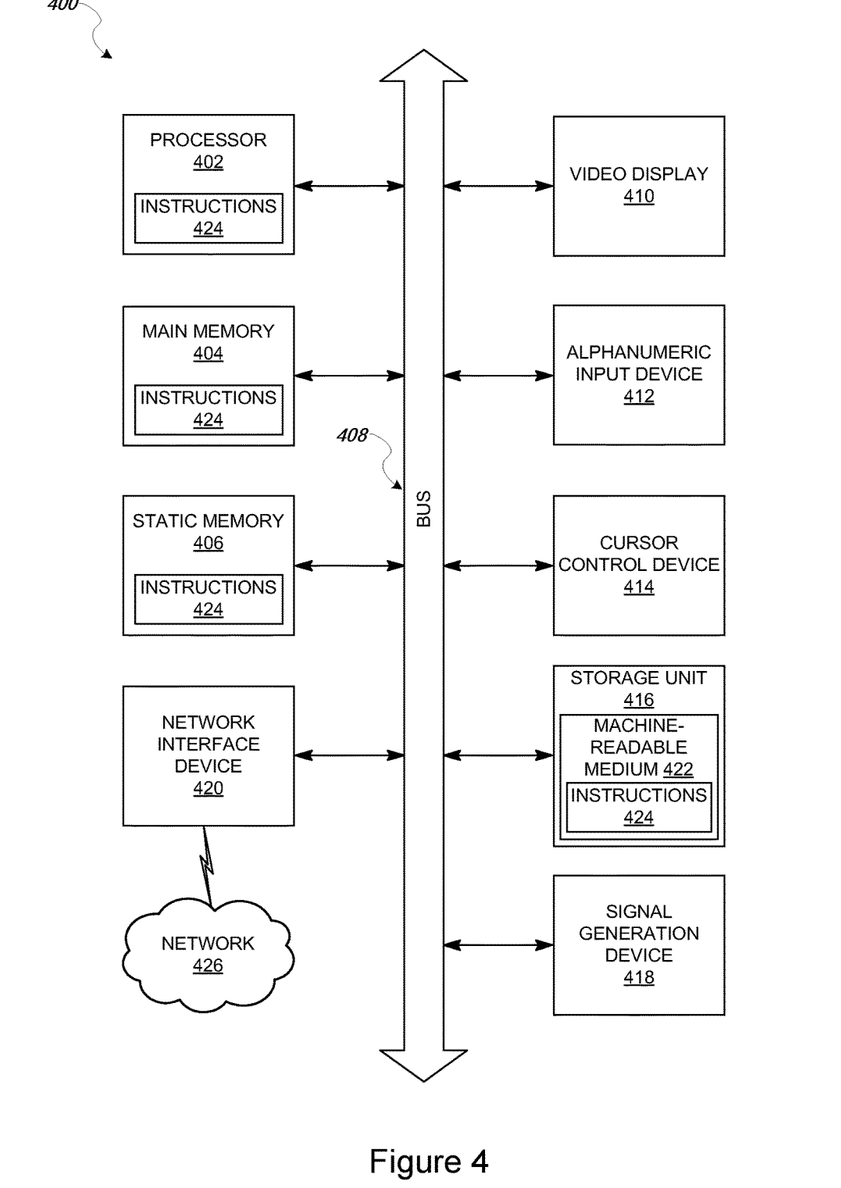
FIG. 4 is a block diagram illustrating components of a machine, according to some example embodiments, able to read instructions from a machine-readable medium and perform any one or more of the methodologies discussed herein.

Referring to FIG. 4, the block diagram illustrates components of a machine 400, according to some example embodiments, able to read instructions 424 from a machine-readable medium 422 (e.g., a non-transitory machine-readable medium, a machine-readable storage medium, a computer-readable storage medium, or any suitable combination thereof) and perform any one or more of the methodologies discussed herein, in whole or in part. Specifically, FIG. 4 shows the machine 400 in the example form of a computer system (e.g., a computer) within which the instructions 424 (e.g., software, a program, an application, an applet, an app, or other executable code) for causing the machine 400 to perform any one or more of the methodologies discussed herein may be executed, in whole or in part.

In alternative embodiments, the machine 400 operates as a standalone device or may be connected (e.g., networked) to other machines. In a networked deployment, the machine 400 may operate in the capacity of a server machine 110 or a client machine in a server-client network environment, or as a peer machine in a distributed (e.g., peer-to-peer) network environment. The machine 400 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 424, sequentially or otherwise, that specify actions to be taken by that machine. Further, while only a single machine 400 is illustrated, the term "machine" shall also be taken to include any collection of machines that individually or jointly execute the instructions 424 to perform all or part of any one or more of the methodologies discussed herein.

The machine 400 includes a processor 402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 404, and a static memory 406, which are configured to communicate with each other via a bus 408. The processor 402 may contain microcircuits that are configurable, temporarily or permanently, by some or all of the instructions 424 such that the processor 402 is configurable to perform any one or more of the methodologies described herein, in whole or in part. For example, a set of one or more microcircuits of the processor 402 may be configurable to execute one or more modules (e.g., software modules) described herein.

The machine 400 may further include a video display 410 (e.g., a plasma display panel (PDP), a light emitting diode (LED) display, a liquid crystal display (LCD), a projector, a cathode ray tube (CRT), or any other display capable of displaying graphics or video). The machine 400 may also include an alphanumeric input device 412 (e.g., a keyboard or keypad), a cursor control device 414 (e.g., a mouse, a touchpad, a trackball, a joystick, a motion sensor, an eye tracking device, or other pointing instrument), a storage unit 416, a signal generation device 418 (e.g., a sound card, an amplifier, a speaker, a headphone jack, or any suitable combination thereof), and a network interface device 420.

The storage unit 416 includes the machine-readable medium 422 (e.g., a tangible and non-transitory machine-readable storage medium) on which are stored the instructions 424 embodying any one or more of the methodologies or functions described herein, including, for example, any of the descriptions of FIGS. 1*a*-3. The instructions 424 may also reside, completely or at least partially, within the main memory 404, within the processor 402 (e.g., within the processor's cache memory), or both, before or during execution thereof by the machine 400. The instructions 424 may also reside in the static memory 406.

Accordingly, the main memory 404 and the processor 402 may be considered machine-readable media 422 (e.g., tangible and non-transitory machine-readable media). The instructions 424 may be transmitted or received over a network 426 via the network interface device 420. For example, the network interface device 420 may communicate the instructions 424 using any one or more transfer protocols (e.g., HTTP). The machine 400 may also represent example means for performing any of the functions described herein, including the processes described in FIGS. 1*a*-3.

In some example embodiments, the machine 400 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 422 able to store data temporarily or permanently and may be taken to include, but not be limited to, random-access memory (RAM), read-only memory (ROM), buffer memory, flash memory, and cache memory. While the machine-readable medium 422 is shown in an example embodiment to be a single medium, the term "machine-readable medium" should be taken to include a single medium or multiple media (e.g., a centralized or distributed STP database 2, or associated caches and servers) able to store instructions 424. The term "machine-readable medium" shall also be taken to include any medium, or combination of multiple media, that is capable of storing the instructions 424 for execution by the machine 400, such that the instructions 424, when executed by one or more processors of the machine 400 (e.g., processor 402), cause the machine 400 to perform any one or more of the methodologies described herein, in whole or in part. Accordingly, a "machine-readable medium" refers to a single storage apparatus or device (such as the system in FIG. 1*a*), as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium 422 is non-transitory in that it does not embody a propagating signal. However, labeling the tangible machine-readable medium 422 as "non-transitory" should not be construed to mean that the medium is incapable of movement; the medium should be considered as being transportable from one physical location to another. Additionally, since the machine-readable medium 422 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 422 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 402 or a group of processors 402) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 402 or other programmable processor 402. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 408) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 402 that are temporarily configured (e.g., by software) or permanently configured to perform the relevant operations. Whether temporarily or permanently configured, such processors 402 may constitute processor-implemented modules that operate to perform one or more operations or functions described herein. As used herein, "processor-implemented module" refers to a hardware module implemented using one or more processors 402.

Similarly, the methods described herein may be at least partially processor-implemented, a processor 402 being an example of hardware. For example, at least some of the operations of a method may be performed by one or more processors 402 or processor-implemented modules. As used herein, "processor-implemented module" refers to a hardware module in which the hardware includes one or more processors 402. Moreover, the one or more processors 402 may also operate to support performance of the relevant operations in a "cloud computing" environment or as a "software as a service" (SaaS). For example, at least some of the operations may be performed by a group of computers (as examples of machines 400 including processors 402), with these operations being accessible via a network 426 (e.g., the Internet) and via one or more appropriate interfaces (e.g., an API).

The performance of certain operations may be distributed among the one or more processors 402, not only residing within a single machine 400, but deployed across a number of machines 400. In some example embodiments, the one or more processors 402 or processor-implemented modules may be located in a single geographic location (e.g., within a home environment, an office environment, or a server farm). In other example embodiments, the one or more processors 402 or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine 400 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The present disclosure is illustrative and not limiting. Further modifications will be apparent to one skilled in the art in light of this disclosure and are intended to fall within the scope of the appended claims.

What is claimed is:

1. A computer-implemented method for determining a layer-2 physical link topology of an Ethernet-type network, the network comprising a plurality of interconnected switches and one or more end hosts, the method comprising:
   determining a unique identity for each switch of the plurality of switches;
   for each switch of the plurality of switches:
      determining a first list of ports that are connected to an end host among the one or more end hosts; and
      determining a second list of ports that are connected to another switch among the plurality of switches;
   creating a third list of pairs of switches, the third list comprising all pairwise permutations of the switches among the plurality of switches, wherein each pair comprises a first switch and a second switch;
   for each pair of switches in the third list:
      determining if a media access layer (MAC) address is stored on the first switch in said each pair;
      when the MAC address is stored on the first switch, then:
         determining a port on the second switch that determined the MAC address stored on the first switch;
         accessing STP-based port identifying data of the determined port of the second switch;
         comparing the STP-based port identifying data of the determined port of the second switch with STP-based port identifying data of all ports in the first switch; and
         when the STP-based port identifying data of the determined port of the second switch matches the STP-based port identifying data of any port in the first switch, then storing the first and the second switch as a physically connected pair of switches; and
   generating the layer-2 physical link topology using each pair of switches that are stored as physically connected pairs.

2. The method of claim 1, further comprising :
   for each pair of switches in the third list that have ports in the second list:
      for each port in the second list, comparing the STP-based port identifying data of said each port of the first switch in said each pair of switches with STP-based port identifying data of all ports in the second switch in said each pair of switches; and
      if the STP-based port identifying data matches, storing the matching pair of switches as a physically connected pair of switches; and
   generating the layer-2 physical link topology further using each pair of matching switches that are stored as physically connected pairs.

3. The method of claim 1, wherein the STP-based port identifying data comprises dot1dStpPortDesignatedBridge and dot1dStpPortDesignatedPort data based on the spanning tree protocol.

4. The method of claim 1, further comprising:
   for each pair of switches in the third list:
      when no MAC address is stored on either the first switch or the second switch in said each pair; then discarding the pair of switches comprising the first and second switch from inclusion as part of the layer-2 physical link topology.

5. The method of claim 1, further comprising:
   for each switch of the plurality of switches:
      determining if a MAC address is identifiable on any port of said each switch connecting to an end host of the one or more end hosts; and
      storing the identified MAC address as being correlated with the determined port of said each switch that is connected to said end host.

6. The method of claim 1, wherein at least one of the pairs of switches used to generate the layer-2 physical link topology is arranged in a multi-chassis link aggregation (MLAG) configuration.

7. The method of claim 1, further comprising:
   when the STP-based port identifying data of the determined port of the second switch does not match the STP-based port identifying data of any port in the first switch, then discarding the pair of switches comprising the first switch and the second switch from inclusion as part of the layer-2 physical link topology.

8. A system configured to determine a layer-2 physical link topology of an Ethernet-type network, the network comprising a plurality of interconnected switches and one or more end hosts, the system comprising:
   a spanning tree protocol (STP) database configured to store STP data;
   an address forwarding table configured to store media access control (MAC) address information;
   a data collector module configured to access the plurality of switches in the network; and
   a correlated data engine coupled to the data collector module, the address forwarding table and the STP database; the correlated data engine comprising a memory and a processor and configured to:
   determine a unique identity for each switch of the plurality of switches;
   for each switch of the plurality of switches:
      determine a first list of ports that are connected to an end host among the one or more end hosts; and
      determine a second list of ports that are connected to another switch among the plurality of switches;
   create a third list of pairs of switches, the third list comprising all pairwise permutations of the switches among the plurality of switches, wherein each pair comprises a first switch and a second switch;
   for each pair of switches in the third list:
      determine if a media access layer (MAC) address is stored on the first switch in said each pair;
      when the MAC address is stored on the first switch, then:
         determine a port on the second switch that determined the MAC address stored on the first switch;
         access STP-based port identifying data of the determined port of the second switch;
         compare the STP-based port identifying data of the determined port of the second switch with STP-based port identifying data of all ports in the first switch; and
         when the STP-based port identifying data of the determined port of the second switch matches the STP-based port identifying data of any port in the first switch, then store the first and the second switch as a physically connected pair of switches; and
   generate the layer-2 physical link topology using each pair of switches that are stored as physically connected pairs.

9. The system of claim 8, wherein the correlated data engine is further configured to:

for each pair of switches in the third list that have ports in the second list:
  for each port in the second list, compare the STP-based port identifying data of said each port of the first switch in each pair of switches with STP-based port identifying data of all ports in the second switch in each pair of switches; and
  if the STP-based port identifying data matches, store the matching pair of switches as a physically connected pair of switches; and
generate the layer-2 physical link topology further using each pair of matching switches that are stored as physically connected pairs.

10. The system of claim 8, wherein the STP-based port identifying data comprises dot1dStpPortDesignatedBridge and dot1dStpPortDesignatedPort data based on the spanning tree protocol.

11. The system of claim 8, wherein the correlated data engine is further configured to:
for each pair of switches in the third list:
  when no MAC address is stored on either the first switch or the second switch in each pair; then discard the pair of switches comprising the first switch and the second switch from inclusion as part of the layer-2 physical link topology.

12. The system of claim 8, wherein the correlated data engine is further configured to:
for each switch of the plurality of switches:
  determine if a MAC address is identifiable on any port of said each switch connecting to an end host of the one or more end hosts.

13. The system of claim 12, wherein the correlated data engine is further configured to:
store the identified MAC address as being correlated with the determined port of said each switch that is connected to said end host.

14. The system of claim 8, wherein the correlated data engine is further configured to:
when the STP-based port identifying data of the determined port of the second switch does not match the STP-based port identifying data of any port in the first switch, then discard the pair of switches comprising the first switch and the second switch from inclusion as part of the layer-2 physical link topology.

15. A computer-readable medium with no transitory signals comprising instructions that, when executed by a processor, cause the processor to perform operations comprising:
determining a unique identity for each switch of the plurality of switches;
for each switch of the plurality of switches:
  determining a first list of ports that are connected to an end host among the one or more end hosts; and
  determining a second list of ports that are connected to another switch among the plurality of switches;
creating a third list of pairs of switches, the third list comprising all pairwise permutations of the switches among the plurality of switches, wherein each pair comprises a first switch and a second switch;
for each pair of switches in the third list:
  determining if a media access layer (MAC) address is stored on the first switch in said each pair;
  when the MAC address is stored on the first switch, then:
    determining a port on the second switch that determined the MAC address stored on the first switch;
    accessing STP-based port identifying data of said port of the second switch;
    comparing the STP-based port identifying data of the determined port of the second switch with STP-based port identifying data of all ports in the first switch; and
    when the STP-based port identifying data of the determined port of the second switch matches the STP-based port identifying data of any port in the first switch, then storing the first switch and the second switch as a physically connected pair of switches; and
generating the layer-2 physical link topology using each pair of switches that are stored as physically connected pairs.

16. The computer readable medium of claim 15, wherein the operations further comprise:
for each pair of switches in the third list that have ports in the second list:
  for each port in the second list, comparing the STP-based port identifying data of said each port of the first switch in said each pair of switches with STP-based port identifying data of all ports in the second switch in said each pair of switches; and
  if the STP-based port identifying data matches, storing the first switch and the second switch as a physically connected pair of switches; and
generating the layer-2 physical link topology further using each pair of switches that are stored as physically connected pairs.

17. The computer readable medium of claim 15, wherein the STP-based port identifying data comprises dot1dStpPortDesignatedBridge and dot1dStpPortDesignatedPort data based on the spanning tree protocol.

18. The computer readable medium of claim 15, wherein the operations further comprise:
when no MAC address is stored on either the first switch or the second switch in said each pair of the third list; then discarding the pair of switches comprising the first switch and the second switch from inclusion as part of the layer-2 physical link topology.

19. The computer readable medium of claim 15, wherein the operations further comprise:
for each switch of the plurality of switches:
  determining if a MAC address is identifiable on any port of said each switch connecting to an end host of the one or more end hosts; and
  storing the identified MAC address as being correlated with the determined port of said each switch that is connected to said end host.

20. The computer readable medium of claim 15, wherein the operations further comprise:
if the STP-based port identifying data of the determined port of the second switch does not match the STP-based port identifying data of any port in the first switch, then discarding the pair of switches comprising the first switch and the second switch from inclusion as part of the layer-2 physical link topology.

\* \* \* \* \*